April 8, 1952　　　　　M. C. CAUGHREAN　　　　　2,592,116
SLED
Filed June 26, 1948　　　　　　　　　　　　　　2 SHEETS—SHEET 1
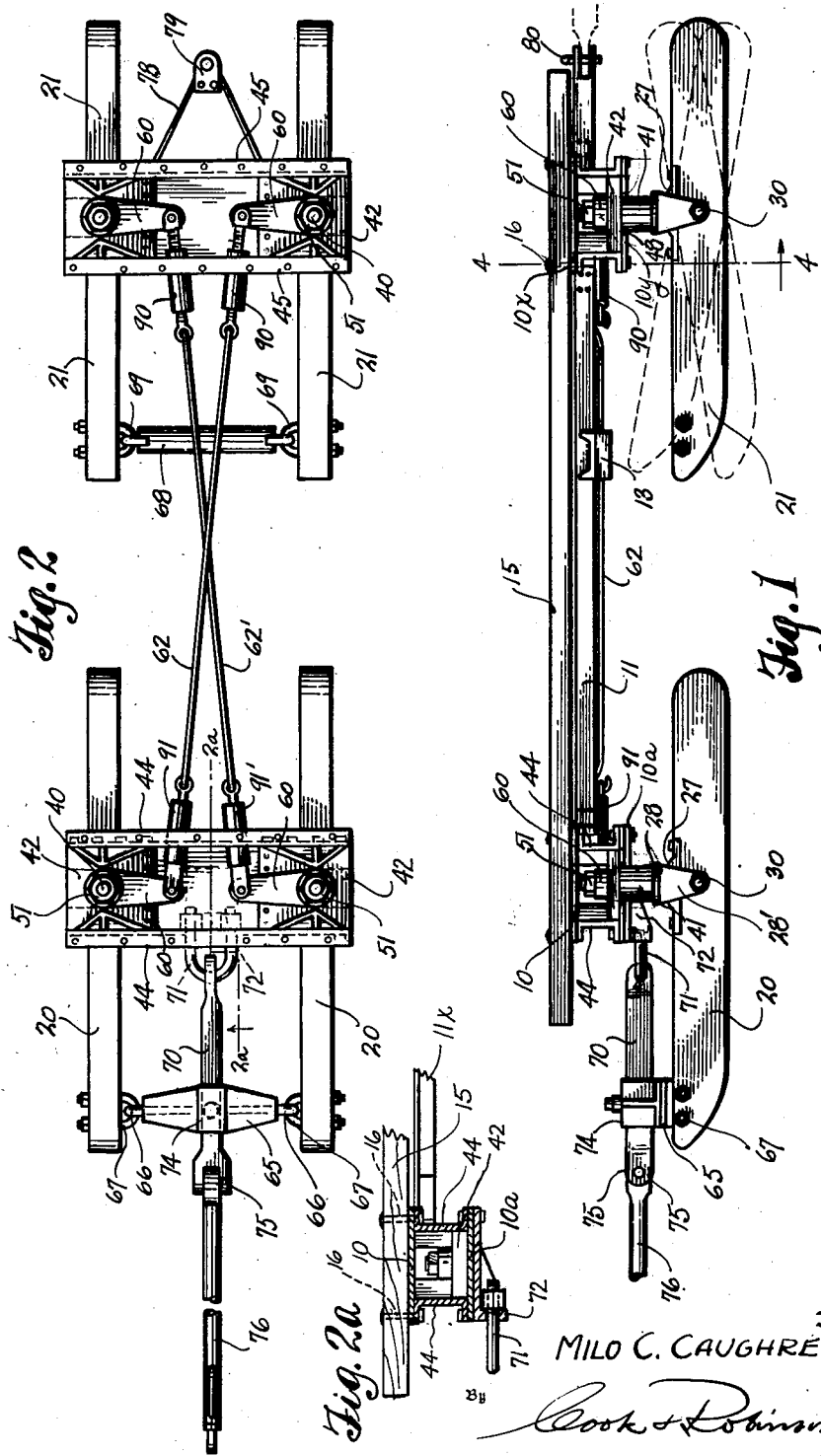
Inventor
MILO C. CAUGHREAN
By
Cook & Robinson
Attorney April 8, 1952     M. C. CAUGHREAN     2,592,116
SLED
Filed June 26, 1948     2 SHEETS—SHEET 2
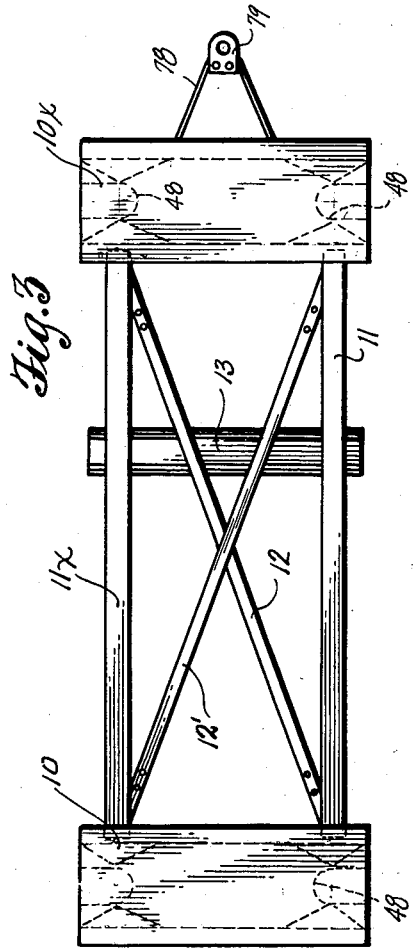
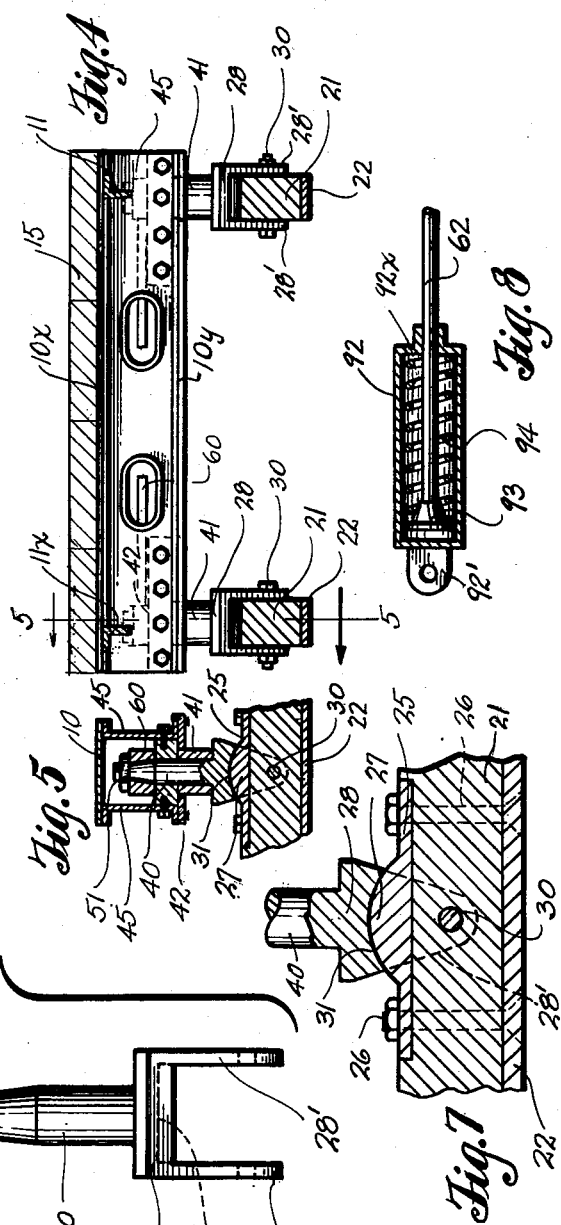
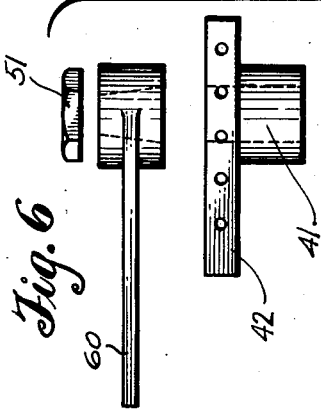
Inventor
MILO C. CAUGHREAN Patented Apr. 8, 1952

2,592,116

UNITED STATES PATENT OFFICE 2,592,116

SLED

Milo C. Caughrean, San Francisco, Calif.

Application June 26, 1948, Serial No. 35,432

4 Claims. (Cl. 280—15)

This invention relates to improvements in snow sleds and it has reference more particularly to the design and details of construction of sleds of large size and especially adapted for the hauling of exceedingly heavy loads; for example, sleds that are to be drawn entrain by crawler-type tractors, for the transportation of heavy freight over rough and winding roads, such as the roads and trails now required to be used in Alaska in winter time.

It is the principal object of this invention to provide a sled of the above character that is of the same general type but an improvement upon the sled of my co-pending application filed under Serial No. 570,543 on December 30, 1944 now Patent No. 2,442,918, issued June 8, 1948; that embodies therein certain novel features of frame construction and in runner mountings that better adapt it to withstand the excessive strains and stresses of heavy hauling over rough and uneven surfaces, and which is designed to better withstand the strains when drawn entrain with other like sleds.

In a general way, the various objects of the present invention reside in the provision of a heavy duty sled having a forward and rearward set of runners, each of which runners has rocking action independent of the others, and wherein runners comprising the forward set are so connected with those comprising the rearward set, that accurate tracking of the runners in making turns is insured. Also, in the provision for a certain limited amount of yieldability in the connecting linkage between the forward and rearward sets of runners that will protect the equipment against breakage due to abnormal or undue strains that are incident to travel over rough roadways where boulders, crevices, and ice blocks are encountered.

Another object of the invention is to provide novel means permitting ready and convenient connection of sleds for use entrain.

Other objects of the invention are to be found in the details of construction of the various parts embodying the under structure of the sled and in the bed, also in the combination, relationship and mode of operation of parts as will hereinafter be fully described.

In accomplishing these and other objects of the invention, I have provided the improved details of construction, the preferred forms of which are illustrated in the accompanying drawings, wherein:

Fig. 1 is a side view of a sled embodying the improvements of the present invention therein.

Fig. 2 is a plan view of the sled understructure, with the bed or body removed therefrom and particularly illustrating the levers and linkage that interconnect the forward and rearward sets of runners for steering control and to insure the tracking of the runners of the rear set with those of the forward set in making turns.

Fig. 2a is a sectional detail taken on line 2a—2a on Fig. 2.

Fig. 3 is a plan view of the frame structure of the bed of the sled, removed from the under structure.

Fig. 4 is a somewhat enlarged cross-sectional view taken substantially on line 4—4 in Fig. 1.

Fig. 5 is a cross section on line 5—5 in Fig. 4, illustrating the runner mounting means.

Fig. 6 is an enlarged view of parts for the mounting and steering of a runner; the parts being shown in a disassembled relationship.

Fig. 7 is an enlarged, sectional detail of the bearing members mounting one of the runners.

Fig. 8 is a sectional detail of a yieldable connector used in conjunction with the runner-connecting linkage.

Referring more in detail to the drawings:

In its present preferred form of construction, the sled comprises a flat, horizontally disposed bed, or body, mounted upon an understructure which includes the two sets of runners and their mounting frames. The bed is made up of a bed frame which is shown in plan view in Fig. 3, and which comprises opposite end plates 10 and 10x, rectangular in form, preferably of structural steel shapes, directed transversely of the bed and extended to its full width. These plates are joined in spaced relationship, as best understood by reference to Figs. 1 and 3, by opposite side beams 11 and 11x; these being bolted, welded or otherwise rigidly and securely joined at their ends to the opposite end plates. To give added rigidity to the bed, the opposite end portions of the side beams are joined by the crossed beams or braces 12 and 12', as shown in Fig. 3, and the side beams 11 and 11x are joined intermediate their ends by a cross beam 13 which, as noted in Fig. 1, is applied to the under sides of these beams.

Mounted lengthwise of the bed frame, and resting upon the end plates 10 and 10x, are planks 15, preferably of wood, which form the bed. It is shown in Fig. 1 that the planks extend at their ends somewhat beyond the plates 10—10x and are secured to the plates by bolts, as at 16.

The sled is equipped with a forward set of runners 20—20 and a rearward set of runners 21—21. Each runner is of substantial length and width and can be made of wood or steel and equipped with steel tires as designated at 22 in Figs. 4, 5 and 7. Runners of both sets are alike in size and those of the rear pair or set are so located that they will track with those of the forward set. The mounting and steering means for the runners will now be described.

Set within the top surface of each runner, at a location substantially medially of the ends of its ground bearing surface, is a bearing plate 25, Fig. 7. If the runner is of wood, this is secured by bolts 26. If the runner is of steel or metal, this bearing would be welded in place. Each plate is formed with an upwardly arched, cylindrically curved bearing member 27 across its top side. Each runner is mounted between the spaced, opposite side arms 28' and 28', of a yoke 28 and is held in the yoke by a pivot bolt 30 that extends through the yoke arms and runner as shown in Figs. 4 and 5. The base of the yoke is formed with a socket 31 having a cylindrically curved surface to which the cylindrical bearing surface of the bearing 27 conforms. Each runner, by reason of this means of mounting, is permitted a substantial amount of rocking action in its vertical, longitudinal plane, as indicated by the dotted line positions of the rear runner in Fig. 1, yet has a secure mounting in and firm supporting contact with its yoke.

Each yoke 28 is equipped with a vertical mounting stem, or pivot shaft 40 that is revoluble in a bearing 41; each bearing being formed as a part of or welded to a horizontally disposed, rectangular plate 42, as has been shown in Fig. 6. The plates 42, corresponding to the forward set of runners, are located between the lower edge portions and securely bolted to the opposite end portions of a pair of transversely directed channel beams or plates 44—44, as shown best in Figs. 1 and 2. Likewise, the mounting plates 42 corresponding to the rearward set of runners are bolted between the opposite end portions of a pair of transversely directed channel beams or plates 45—45 as has been shown in Figs. 4 and 5.

The cross beams 44—44 of the forward structure are joined across their under sides by a metal plate 10a. Likewise, the cross beams 45—45 are joined by a plate 10y. Plates 10a and 10y are recessed at their ends, as indicated in dotted lines at 48 in Fig. 3, for easy removal of runner assemblies by releasing of the plates 42.

The frame structure of the bed of the sled is mounted upon the under structure as has been illustrated in Fig. 1. In the assembly of parts, the opposite end plates 10 and 10x are disposed flatly upon the top edges of the cross beams 44—44 and 45—45, and are secured thereto by the bolts 16 or by welding. Thus the frame structure of the bed, including the parts 10—10x, 11—11x, and 12 and 12', forms a rigid tie between the mounting beams of the forward and rearward pairs of runners.

For steering and towing the sled, I have provided the following described means:

It is shown in Fig. 5, that the upper end portions of the pivot shafts 40 which mount the various runner holding yokes, extend through and beyond their respective mounting plates 42, as in Fig. 5.

Applied to the upper end portions of the various pivot shafts, which preferably are tapered as noted best in Figs. 5 and 6, and keyed against turning thereon, are steering lever arms 60; these being held in place by nuts 51 threaded onto the upper ends of the shafts 40, as shown in Figs. 2 and 5. The lever arms 60 of paired runners extend directly toward each other when the runners are in a direct forward position, as will be understood by reference to Fig. 2, and the levers of the two runners at the forward end of the sled are joined, respectively, with the lever arms of the opposite side runners of the rearward set by means of crossed rods 62—62', as in Fig. 2, thus to provide that when the runners of the forward set are turned toward one side or the other, the runners of the rearward set will be turned to a corresponding amount toward the other side, thus to cause the runners of the two sets to track in making turns, and to facilitate the making of sharp, short turns and to make travel easier.

To steady the relative parallel relationship of paired runners, those of the forward set are connected between their forward ends by a crosslink 65 that has pivotal connection at its ends, as at 66 in Fig. 2, with U-bolts 67 secured in the runners. Likewise, the runners of the rearward set are joined across their forward ends by a cross link 68 pivotally joined at its ends with U-bolts 69 secured on the forward ends of the runners.

A draw bar 70 is pivotally connected at its rearward end by a U-bolt 71, shown in Fig. 1, to a bracket 72 that is secured to plate 10x medially of the opposite ends of the cross beams 44—44, as shown in Figs. 2 and 2a.

This bar has longitudinal movement in a guide bearing 74 that is pivoted centrally on the cross link 65. At its forward end the bar 70 is equipped with a yoke 75 for attachment to a draft link of the kind shown at 76 in Fig. 2.

At the rear end of the sled, a draft connection is provided through the mediacy of a V-shaped strap 78 that is attached at its ends to the rear cross plate or channel 45, and at its vertex is equipped with a block 79 to which the draw bar or tongue 76 of a following sled may be attached by a pin 80 as indicated in Fig. 1.

A feature of the present invention resides in the provision of a certain amount of yieldability in the forward and rearward sets of runners as provided by the crossed rods 62—62'. At the rear end of the sled the crossed rods are joined with their respective steering levers 60 by means of turn buckles 90 as shown in Fig. 2, which provide for making any desired or necessary adjustment in the effective lengths of the rods for spacing and alignment of runners of the two sets. At their forward ends, the rods 62—62' are joined with their respective steering levers 60 by means of yielding connectors designated generally in Fig. 2 by reference numerals 91—91'. As shown in detail in Fig. 8, each of the connectors comprises a cylindrical container 92, equipped with an ear 92' at its forward end for its pivotal connection with the lever arm 60 and, at its rearward end, receives the forward end of the rod 62 or 62' therein; the rod passing slidably through an opening in the end wall 92x of the cylindrical container.

The rods 62—62' are equipped at their forward ends, within their respective cylinders 92—92, with heads 93, and coiled springs 94 are retained under compression between the heads and end walls 92x of the cylinders. Under normal operation the springs 94 hold the heads 93 near the forward end walls of the cylinders, but under any abnormal strain on the runners, that might be caused by striking a boulder, or ice block, the springs will yield, thus to relieve the runners or their mounting structure of any abnormal or destructive shock or strain that may occur.

Sleds so constructed have proven to be of exceptional value in arctic regions and it is anticipated that they shall be made in various sizes. Beds or bodies of various kinds may be employed in the bed frame structure, and it is not intended that they be restricted to any particular form.

The assembly of parts shown in Fig. 6 is important, in that it permits easy and ready removal of runners for replacement or repair, or the quick removal or replacement of an entire runner assembly by releasing the mounting plate 42 from between its mounting beams 44—44 or 45—45.

Having thus described my invention, what I claim as new therein and desire to secure by Letters Patent is:

1. A heavy duty sled comprising a bed frame, front and rear cross beams of tubular construction rigidly joined by the bed frame, bearing blocks detachably fixed in the under sides of the cross beams at opposite ends thereof, a runner mounting yoke associated with each block having a vertical mounting stem extended upwardly from the yoke base and rotatably fixed in the block and extended into the hollow beams, a runner mounted in each yoke for steering thereby and for vertical rocking action, and a steering lever arm fixed to each stem and housed within the hollow beams with clearance for steering action thereby.

2. In a heavy duty sled, front and rear cross frames, each comprising a pair of spaced, coextensive and rigidly joined beams, bearing blocks mounted between the paired beams at their opposite ends and under sides, a sled runner corresponding to each bearing block and a mounting yoke for each runner; each of said yokes having a vertical mounting stem rotatably contained in the corresponding block and extended to the top side thereof and a steering arm fixed to the stem between the paired beams, and links joining the steering arms of front and rear runners for coordinating the steering action of the runners; said spaced beams being closed at top and bottom, and said steering arms having clearance therein for steering action.

3. A sled structure as recited in claim 2 wherein the said bearing blocks are removably mounted in the cross frames to provide for dismounting of the runner assemblies from the cross frames.

4. A heavy duty sled comprising front and rear cross frames, a bed frame rigidly joining the said cross frames, a bed overlying and fixed to the bed frame and cross frames; each cross frame comprising a pair of spaced, coextensive beams, bearing blocks fitted between the beams of the cross frames at their opposite ends, removable bolts securing said blocks in said cross frames, a sled runner associated with each block, a mounting yoke for each runner and in which the runner is mounted for vertical rocking action, a vertical mounting stem on the yoke extended through and rotatable in the corresponding block, lever arms fixed to the stems and housed between the spaced beams for the clearance for steering action, means joining the arms of front and rear runners to effect coordinated steering action, a draw bar pivotally attached to the forward cross frame at a point medial of its ends and means for effecting steering action of the runners through the lateral movement of the draw bar.

MILO C. CAUGHREAN.

REFERENCES CITED

The following references are of record in the file of this patent:

UNITED STATES PATENTS

| Number | Name | Date |
| --- | --- | --- |
| 409,298 | Parker | Aug. 20, 1889 |
| 803,870 | Briggs | Nov. 7, 1905 |
| 961,469 | Walpole | June 14, 1910 |
| 1,049,548 | Strupp | Jan. 7, 1913 |
| 1,220,822 | Brothen | Mar. 27, 1917 |
| 1,743,381 | Norman | Jan. 14, 1930 |
| 1,770,078 | Landerdahl | July 8, 1930 |
| 2,442,918 | Caughrean | June 8, 1948 |